G. MÜLLER.
DEVICE FOR USE WITH NAILS.
APPLICATION FILED JULY 30, 1914.
1,399,306.
Patented Dec. 6, 1921.
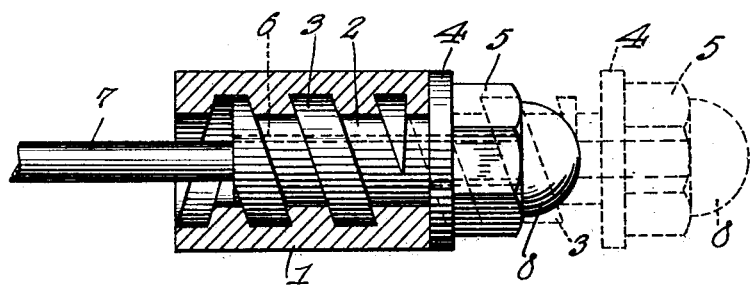
Inventor
George Müller
By: B. Smiger
Atty.

UNITED STATES PATENT OFFICE.

GEORG MÜLLER, OF WURTTEMBERG, GERMANY.

DEVICE FOR USE WITH NAILS.

1,399,306.   Specification of Letters Patent.   Patented Dec. 6, 1921.

Application filed July 30, 1914.   Serial No. 854,210.

(GRANTED UNDER THE PROVISIONS OF THE ACT OF MARCH 3, 1921, 41 STAT. L., 1313.)

*To all whom it may concern:*

Be it known that I, GEORG MÜLLER, a manufacturer, and a citizen of the Kingdom of Wurttemberg, residing at Lederstrasse 65, Schwäb.-Gmünd, Wurttemberg, Germany, have invented certain new and useful Improvements in Devices for Use with Nails; and I do hereby declare the following to be a full, clear, and exact description of the invention.

This invention relates to a nail and sleeve device adapted for use for attaching articles of different descriptions—such for instance as supporting hooks for stagings or framework, wall hooks, console holders, curtain rosette holders, curtain rods, clothes hooks and the like—to wall surfaces, in such a way that the attachment and detachment of the said articles are not likely to cause any appreciable damage.

The drawing represents a preferred form of the nail and sleeve device, according to the invention, in longitudinal section.

The preferred form of the device illustrated in the drawing shows that the device comprises a sleeve formed as a screw nut 1 in which is screwed a sleeve 2 provided with an external screw thread 3. This latter sleeve forms the actual guide for the nail 7 to be inserted into the wall. At the outer end of the screw threaded sleeve 2 is provided a projecting or flanged portion 4 and a reduced portion 5, which reduced portion is hexagonal in shape and is intended for a corresponding shaped spanner. The head 8 of the nail 7 to be inserted into the wall comes against the hexagonal projecting portion 5 of the removable screw threaded sleeve 2, as soon as the said nail 7 has been inserted into the wall as far as possible. If, however, in the process of being inserted the nail comes into contact with an obstacle so that it only enters the wall for a portion of its length then there is left between the head 8 of the nail and the hexagonal projecting portion 5 of the screw threaded sleeve 2, and between the wall surface and the rear end of the sleeve 1 or the wall plate in connection therewith a certain amount of clearance. The connection between the nail and the wall would, therefore, be insecure as it could be easily weakened and the supporting capacity would be reduced. In order to avoid this drawback the screw threaded sleeve 2 may be unscrewed sufficiently far from the fixed sleeve 1 for the hexagonal portion 5 to take against the head 8 of the nail 7, as shown in the dotted portion at Fig. 1, the result being that by the tensioning of the sleeve the inner end of the sleeve 1, which may be formed as a wall plate is forced firmly against the wall surface. This affords a support for the nail, the supporting capacity of which is sensibly increased, and the possibility of it becoming loosened is practically eliminated.

If it is desired to remove the nail 7 from the wall, the screw threaded sleeve 2 is unscrewed from the sleeve 1, the result being that the nail 7 is withdrawn positively and in a straight line, owing to the screw threaded sleeve 2 moving out of the sleeve 1 and pushing against the head 8 of the nail.

As during this operation the rear end of the sleeve 1 which may be formed with the wall hook is forced into close contact with the wall surface, any damage to the same, for instance by loosening or pulling away plaster or the like is entirely avoided.

What I claim as my invention and desire to secure by Letters Patent of the United States of America is:—

In a device of the character described, the combination of an outer sleeve with an inner sleeve forming a nail guide and having an external thread, a flanged portion at the outer end of the inner sleeve and a hexagonal reduced portion on the externally threaded sleeve adapted to provide a grip for a wrench, substantially as described.

In testimony whereof I affix my signature in presence of two witnesses.

GEORG MÜLLER.

Witnesses:
MARIA MÜLLER,
PAULINE MÜLLER.